United States Patent
Beluffi et al.

(10) Patent No.: US 7,918,607 B2
(45) Date of Patent: Apr. 5, 2011

(54) CONICAL ROLLER BEARING COMPRISING A FILTER CAGE

(75) Inventors: Stépahne Beluffi, Seynod (FR); Julien Berthier, Annecy (FR); Sandrine Lornage, Andrezieux Boutheon (FR); Sabine Delafosse, Albens (FR); Gérard Mermoud, La Balme de Sillingy (FR); Christophe Rimoux, Epagny (FR)

(73) Assignee: S.N.R. Roulements, Annecy (FR)

( * ) Notice: Subject to any disclaimer, the term of this patent is extended or adjusted under 35 U.S.C. 154(b) by 433 days.

(21) Appl. No.: 11/884,119

(22) PCT Filed: Feb. 10, 2006

(86) PCT No.: PCT/FR2006/050121
§ 371 (c)(1),
(2), (4) Date: Apr. 1, 2008

(87) PCT Pub. No.: WO2006/085037
PCT Pub. Date: Aug. 17, 2006

(65) Prior Publication Data
US 2008/0193070 A1 Aug. 14, 2008

(30) Foreign Application Priority Data
Feb. 11, 2005 (FR) ...................... 05 01423

(51) Int. Cl.
*F16C 19/00* (2006.01)
*F16C 33/48* (2006.01)
(52) U.S. Cl. ...................... 384/470; 384/572

(58) Field of Classification Search .................. 384/571, 384/470, 477, 480, 573, 574, 575, 576, 577, 384/578, 579, 580, 572
See application file for complete search history.

(56) References Cited

U.S. PATENT DOCUMENTS

| 3,694,043 | A | | 9/1972 | Tellson |
| 4,664,537 | A | | 5/1987 | Ascheron et al. |
| 6,022,148 | A | * | 2/2000 | Back et al. ................... 384/576 |

FOREIGN PATENT DOCUMENTS

| DE | 43 38 350 A1 | | 5/1995 |
| EP | 0 644 343 A | | 3/1995 |
| EP | 1 245 846 A | | 10/2002 |
| JP | 55020923 A | * | 2/1980 |
| JP | 06050346 A | * | 2/1994 |

* cited by examiner

*Primary Examiner* — Thomas R Hannon
*Assistant Examiner* — Phillip A Johnson
(74) *Attorney, Agent, or Firm* — Arent Fox LLP

(57) ABSTRACT

A roller bearing includes a plurality of conical roller bodies arranged between inner and outer rings, and a cage having an annular sectional body mounted between the inner and outer rings. The annular sectional body further having an annular oil thrower located on each transverse side, each oil thrower having internal and external radial projections, wherein the free end of each projection is positioned opposite and away from a corresponding one of the inner and outer rings. The bearing has functional axial and radial clearances between the internal and external radial projections and the internal and outer rings. The clearances facilitate the passage of a bearing lubrication fluid there through and form an obstacle to the passage of solid particles.

10 Claims, 3 Drawing Sheets

CONICAL ROLLER BEARING COMPRISING A FILTER CAGE

CROSS-REFERENCE TO RELATED APPLICATION

This application is a National Stage entry of International Application No. PCT/FR06/050121, filed Feb. 10, 2006, the entire specification claims and drawings of which are incorporated herewith by reference.

1. Field of the Invention

This invention relates to a roller bearing and a shell intended to be mounted in such a roller bearing.

This invention more particularly applies to conical roller bearings, i.e. (bearings having one inner and one outer rings comprising diagonal raceways between which conical rolling bodies are positioned.

2. Description of the Related Art

Such bearings are more particularly applied to the rotation of an automobile wheel with respect to said vehicle framework, thanks to their capacity to stand large axial and radial efforts.

One problem with this type of bearings is that of lubrication and protection against outside pollution solid particles, such as dust.

Roller bearings are known in which, between the inner and outer rings is mounted a shell which provides, on the one hand, the function of positioning rolling bodies with respect to one another and on the other hand the function of filtration, i.e. allows the passage of a bearing lubrication fluid while serving as a barrier to the passage of solid particles.

According to known embodiments, the shell comprises an annular body on the transversal edges of which oil throwers generally radially extend.

More particularly, document EP-A-0 644 343 describes a conical roller bearing comprising a shell to which sealing means closing the space between the inner and outer rings are fixed. A filter is made while providing for openings in the sealing means.

Such embodiment however is not totally satisfactory as regards the quality of the lubrication obtained. As a matter of fact, the localised and essentially axial openings do not make it possible to obtain the regular and uniform passage of a sufficient quantity of lubrication fluid into the bearing. The bearing then runs the risk of a quick deterioration because of the important radial and axial efforts.

Besides, such openings are not suitable for the lubrication of conical roller bearings in which the diagonal contact between the rolling bodies and the raceways generally induces the displacement of the lubrication fluid from the transversal edge on the bearing large diameter side towards the transversal edge on the bearing small diameter side.

Besides, the sealing means in contact with the inner and outer rings create a friction couple which affects the bearing performances as regards the rings relative rotation and which causes the sealing means to wear.

Besides, the above-mentioned embodiment makes more complex the mounting of conical roller bearings in which the mounting of the outer ring onto the inner ring is carried out after having positioned the rolling bodies on the inner ring. This invention aims at solving such problems by providing a conical roller bearing comprising a shell which easily combines and enhances the functions of positioning rolling bodies and of filtration.

SUMMARY OF THE INVENTION

This invention therefore provides a roller bearing comprising at least an inner ring and an outer ring, said rings comprising diagonal raceways between which conical rolling bodies each being provided with its own rotation axis, are positioned so as to allow the relative rotation of said rings, a shell comprising a generally tapered annular body being mounted between the inner and outer rings, the body comprising equally distributed openings in each of which a rolling body is positioned generally along its own rotation axis, said shell further comprising an annular oil thrower extending generally radially to each of the body transversal edges, each annular oil thrower comprising at least one generally radial inner protrusion and one generally radial outer protrusion which extend on either side of the body towards the inner ring and the outer ring, respectively, the free end of each protrusion being positioned opposite and away from the corresponding ring so that the bearing has axial and radial functional clearances between the protrusions and the rings, the dimensions of said clearances being such as to allow the passage of a bearing lubrication fluid and to serve as a barrier to the passage of solid particles.

The roller bearing according to this invention thus shows a combination of four radial and axial clearances so as to allow a regular passage of a sufficient quantity of lubrication fluid. Besides, the absence of contact between the protrusions and the rings simplifies the mounting of the bearing and makes it possible not to add a friction couple while serving as a barrier to the passage of solid particles.

According to a particular embodiment, at least one of the transversal edges of the outer ring is located between the transversal edges of the inner ring, the outer and inner protrusions of the corresponding annular oil thrower having their free ends positioned opposite a radial surface of the outer ring and an axial surface of the inner ring, respectively.

Such embodiment is suitable for the displacement of the lubrication fluid in the conical roller bearing so as to provide a satisfactory lubrication of the bearing.

According to a second aspect, this invention relates to a shell intended to be mounted in a roller bearing according to the first aspect, said shell comprising a generally tapered annular body, the body comprising equally distributed openings in each of which a rolling body is intended to be positioned generally along its own rotation axis, said shell further comprising an annular oil thrower extending generally radially to each of the body transversal edges, each annular oil thrower comprising at least one generally radial inner protrusion and one generally radial outer protrusion which extend on either side of the body, the dimensions of each annular oil thrower being such that the free end of each protrusion is positioned opposite and away from the corresponding ring and allows axial and radial functional clearances between the protrusions and the rings, the dimensions of said clearances being such as to allow the passage of a bearing lubrication fluid and to serve as a barrier to the passage of solid particles.

Further objectives and advantages of the invention will become apparent from the following description made in reference to the appended drawings, wherein:

DETAILED DESCRIPTION OF THE INVENTION

Figure 1:
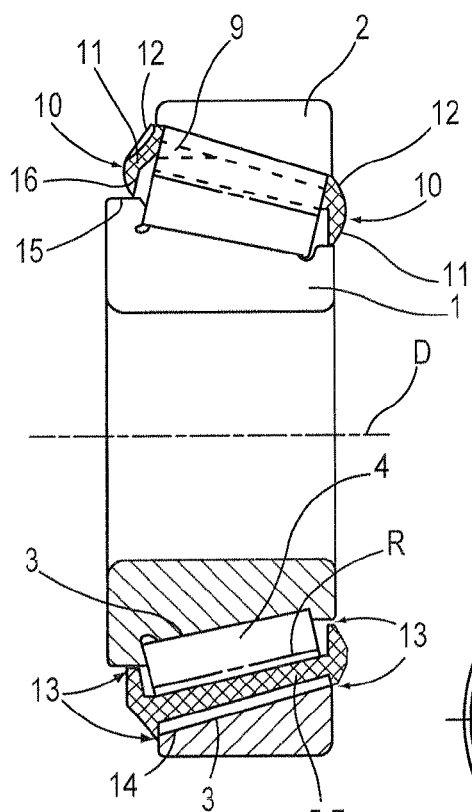
FIG. 1 is a longitudinal section view of a conical roller bearing comprising a shell according to a first embodiment, providing the positioning of conical rolling bodies with respect to one another between diagonal raceways provided on inner and outer rings, said shell comprising an annular oil thrower at each end of a tapered annular body, each oil thrower comprising continuous annular protrusions, axial and radial functional clearances being formed between the protrusions and the rings.
Figure 2:
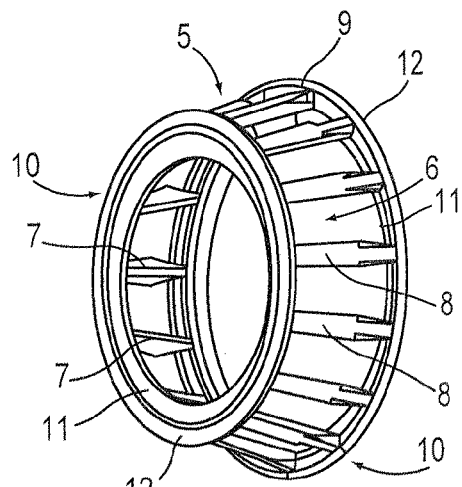
FIG. 2 is a perspective view of the conical ball bearing small diameter side of FIG. 1.
Figure 3:
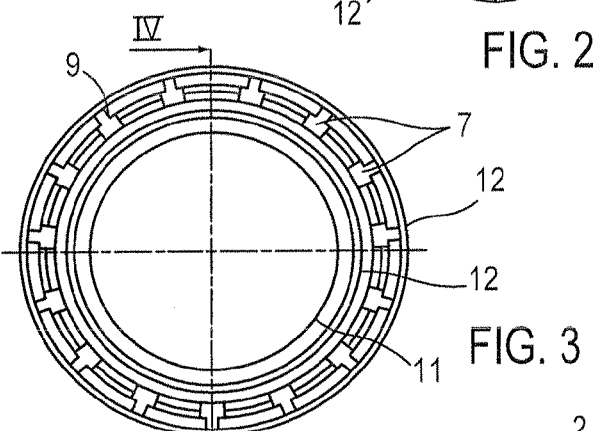
FIG. 3 is a view of the transversal face of the shell of the conical ball bearing small diameter side of FIG. 1.
Figure 4:
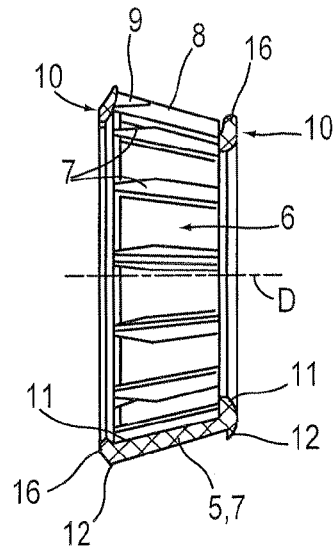
FIG. 4 is a longitudinal section view along line IV-IV in FIG. 3.
Figure 5:
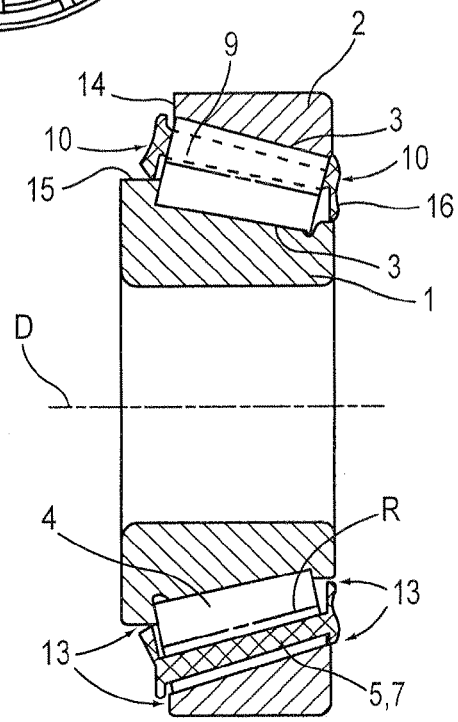
FIG. 5 is a longitudinal section view of a roller bearing comprising a shell according to a second embodiment, each oil thrower comprising a plurality of adjacent protrusions, the outer transversal surface of each oil thrower being bent towards the other oil thrower.
Figure 6:
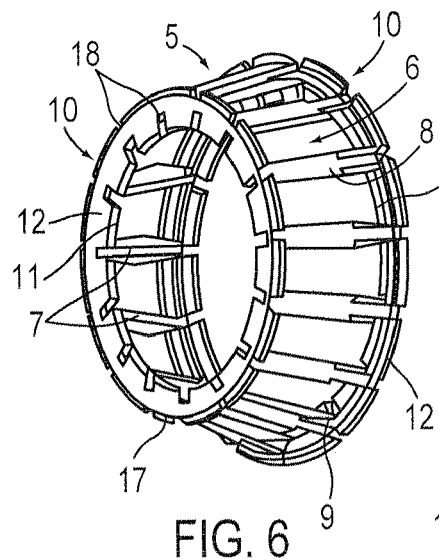
FIG. 6 is a perspective view of the shell of the conical ball bearing small diameter side of FIG. 5.
Figure 7:
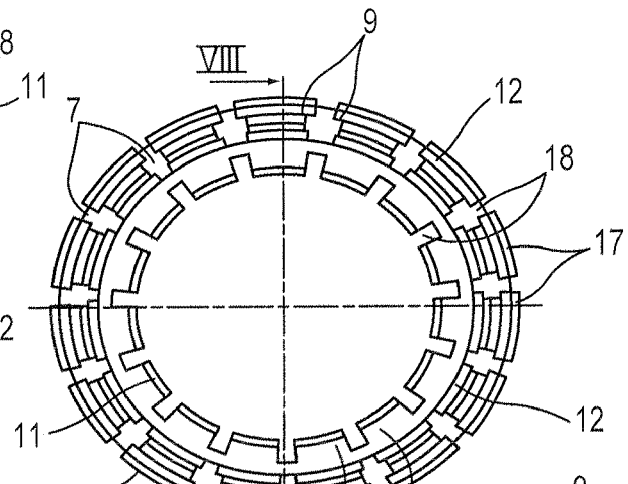
FIG. 7 is a view of the transversal face of the shell of the conical ball bearing small diameter side of FIG. 5.
Figure 8:
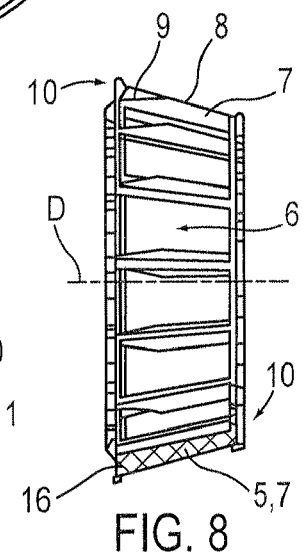
FIG. 8 is a longitudinal section view along line VIII-VIII in FIG. 7.
Figure 9:
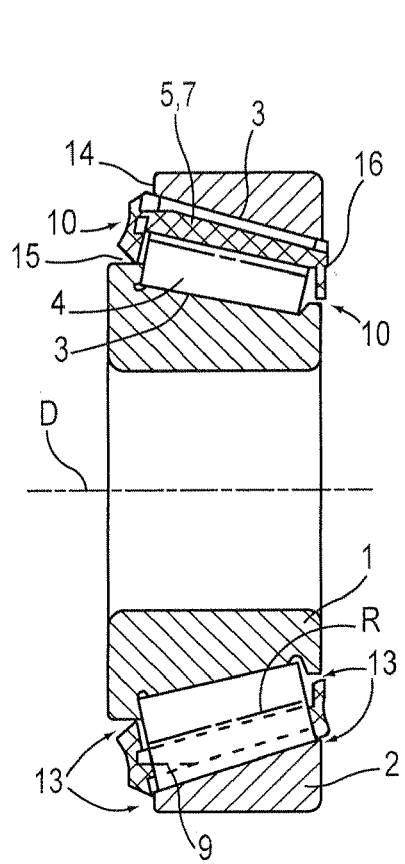
FIG. 9 is a longitudinal section view of a roller bearing comprising a shell according to a third embodiment, the oil thrower on the large diameter side being associated to the body transversal edge by associating means.
Figure 10:
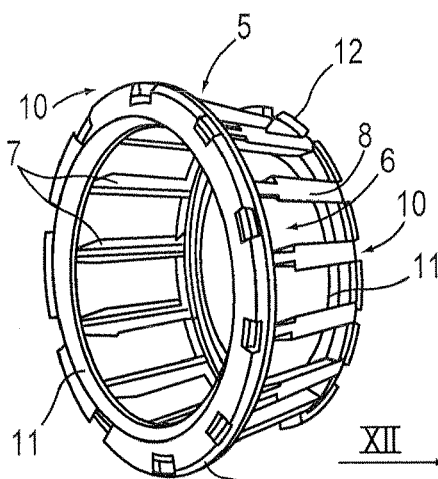
FIG. 10 is a perspective view of the shell on the conical ball bearing large diameter side in FIG. 9.
Figure 11:
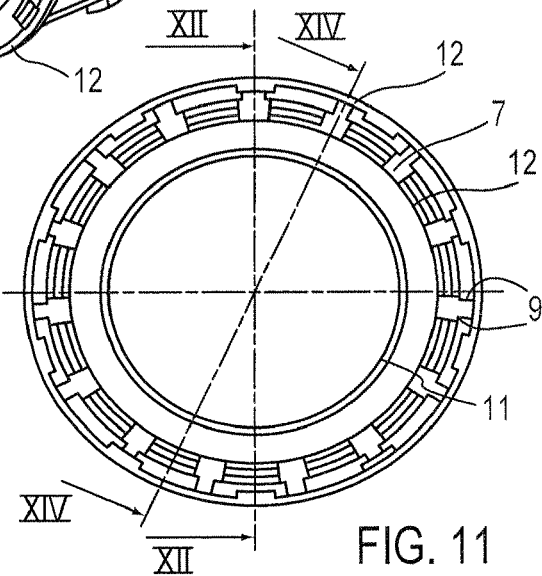
FIG. 11 is a view of the transversal face of the shell on the conical ball bearing small diameter side in FIG. 9.
Figure 12:
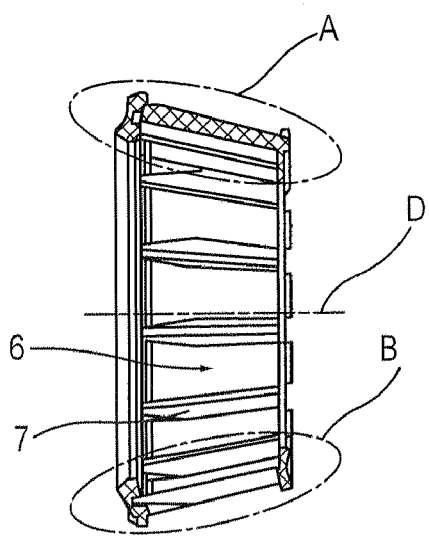
FIG. 12 is a longitudinal section view along line XII-XII in FIG. 11.
Figure 13A:
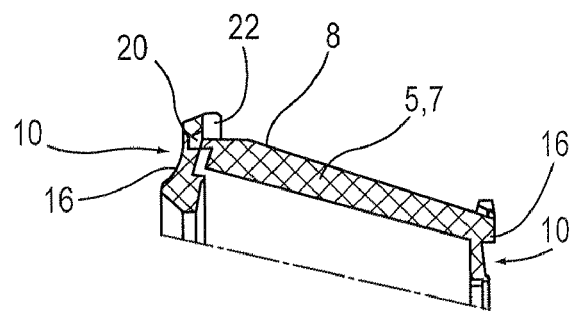
FIGS. 13a and 13b are partial views of details A and B in FIG. 12, respectively showing the means for associating the oil thrower with the body, said means comprising centering pads and hooks provided on the body transversal edge and holes provided on the annular oil thrower.
Figure 13B:
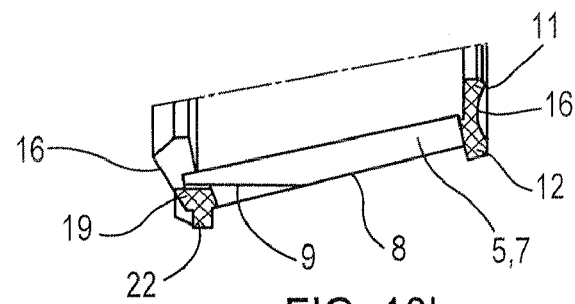
Figure 14:
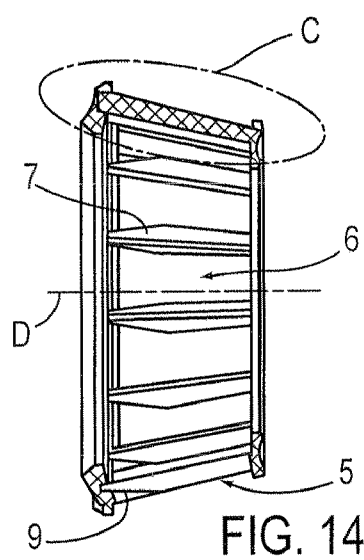
FIG. 14 is a longitudinal section view along line XIV-XIV in FIG. 11.
Figure 15:
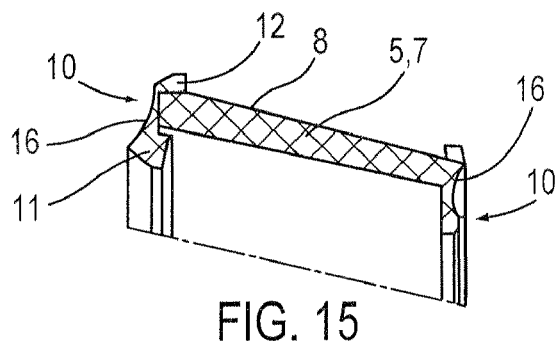
FIG. 15 is a perspective view of detail C in FIG. 14.

With reference to the Figures, a roller bearing having an axis D is described. Such roller bearing comprises a first ring 1 and a second ring 2 which are coaxial and comprise, each, a raceway 3, diagonal to axis D.

The description made with reference to such embodiment however is directly applicable to a bearing comprising first 1 and second 2 rings on each of which two raceways 3 are provided, with the first ring 1 and the second ring 2 being made in two parts, each comprising a raceway 3.

In the following description, "axial" or "longitudinal" or "side" and "radial" refer to planes parallel and perpendicular to axis D, respectively. Besides, "outer" and "inner" refer to longitudinal planes away from and close to axis D or to transversal planes located close to and away from the bearing transversal edges, respectively.

Raceways 3 are so inclined that the radial clearance between the raceways 3 is reduced together with the radial clearance between each raceway 3 and axis D. The roller bearing then has a large diameter close to the transversal edge where the radial clearance between the raceways 3 of the same ring 1,2 is the greatest and a small diameter close to the transversal edge where the radial clearance between the raceways 3 of the same ring 1,2 is the smallest.

Identical conical rolling bodies 4, each of which is provided with its own rotation axis R, are positioned between the diagonal raceways 3 so as to allow the relative rotation of the first 1 and second 2 rings with respect to axis D.

The conical rolling bodies 4 are held in position with respect to each other between the first inner ring 1 and the second outer ring 2 by means of a shell mounted between said rings.

The shell comprises a generally tapered annular body 5 which has an inner surface and an outer surface inclined with respect to axis D. The general inclination of the body 5 is substantially the same as that of raceways 3 and the axial dimension of the annular body substantially corresponds to the axial dimension of raceways 3. Besides, the body 5 thickness, i.e. the radial clearance between its inner and outer surfaces is generally lower than the diameter of the conical rolling bodies 4 circular sections. Besides, such thickness substantially increases from the small diameter to the large diameter of the bearing.

The body 5 comprises equally distributed openings 6 in each of which a rolling body 4 is positioned generally along its own rotation axis R. On the Figures, the rolling bodies 4 own rotation axis R is located under the inner surface of the annular body 5. The annular body 5 thus has, between two consecutive openings 6, material bridges 7 having a general pyramidal shape the bases of which form the annular body 5 outer surface. Close to the large diameter, an axial groove 9 is made on a portion of each side face of the material bridges 7. The material bridges 7 thus provide on said portion substantially parallel surfaces the transversal clearance of which is smaller than the transversal clearance of the base edges 8.

The conical roller bearings, i.e. bearings comprising diagonal raceways 3 between which conical rolling bodies 4 are positioned, are used to allow the relative rotation of a first part integral with one of the rings with respect to a second part integral with the other ring, while supporting important axial and radial loads. More particularly, such bearings are used to allow the rotation of an automobile wheel with respect to said vehicle framework.

Therefore, the lubrication of the bearing and its protection against the introduction, between rings 1,2, of outside pollution solid particles such as dust, are essential to obtain a bearing with a satisfactory service life.

In addition to the function of positioning rolling bodies 4 with respect to each other between rings 1,2 it is provided that the shell also fulfils a filtration function, i.e. allows the passage of a bearing lubrication fluid and serves as a barrier to the passage of solid particles.

Therefore, the shell further comprises an annular oil thrower 10 which generally extends radially to each of the transversal edges of the annular body 5. The shell then comprises a larger diameter annular oil thrower 10 located on the bearing large diameter side and a smaller diameter annular oil thrower 10 located on the bearing small diameter side. Each annular oil thrower 10 comprises at least one inner protrusion 11 and one outer protrusion 12 which are generally radial and extend on either side of the body 5, towards the inner ring 1 and the outer ring 2, respectively. Radial as well as axial dimensions of each annular oil thrower 10 are provided such that the free end of each protrusion 11,12 is positioned opposite and away from the corresponding ring 1,2. The bearing also has axial and radial functional clearances between the inner protrusions 11 and the inner ring 1 and the outer protrusions 12 and the outer ring 12.

The dimensions of the functional clearances 13 are such that enable the optimum execution of the filtration function. In addition, such execution of the filtration function is enhanced by the combination of the four functional, axial as well as radial, clearances between the protrusions 11,12 and the rings 1,2. Besides, functional clearances 13 make it possible to prevent the passage of outside pollution particles without frictional contact between the protrusions 11, 12 and the rings 1,2. The addition of a friction couple during the relative rotation of the rings 1,2 and thus affecting the bearing performances is thus avoided. Besides, the bearing as it has just been described can easily be mounted since the functional clearances 13 allow the mounting of the outer ring 2 onto the inner ring 1, on which the conical rolling bodies 4 positioned in the shell are mounted.

Besides, the filtration function is easily obtained since it requires no particular machining. The provision of contact faces on the inner 1 and outer 2 rings, for example, is thus avoided and such rings can be standard rings. The provision of holes in the oil throwers 10 is also avoided.

In the Figures it is provided that at least one of the transversal edges of the outer ring 2 will be located between the transversal edges of the inner ring 1. More particularly, the outer ring 2 has a lower axial dimension than the inner ring 1, the transversal edges of the inner 1 and outer 2 rings on the bearing small diameter side are substantially positioned in the same plane, whereas the transversal edge of the outer ring 2 on the large diameter side is located between the transversal edges of the inner ring 1.

In addition to the reduction of the bearing axial overall dimension, this embodiment is particularly suitable for enhancing the shell filtration function in a conical roller bearing.

As a matter of fact, the outer 11 and inner 12 protrusions of the annular oil thrower 10, on the large diameter side, may have their free ends positioned opposite a radial surface 14 of the outer ring 2 and an axial surface 15 of the inner ring 1, respectively.

Thus, the special position of protrusions 11,12 with respect to the rings 1,2 surfaces, on the one hand and the presence of grooves 9, on the other hand, are combined, on the bearing large diameter side. Such combination makes it possible to obtain a regular passage of a sufficient quantity of lubrication fluid. In addition, the combination is suitable for the particular lubrication of a conical roller bearing in which the lubrication fluid is generally displaced from the large diameter side to the small diameter side, because of the inclined raceways and the conical rolling bodies 4. As a matter of fact, the lubrication fluid can be "stored" on the axial wall 15 of the inner ring 1 and in the grooves 9 so that its distribution into the bearing is uniform.

According to a first embodiment shown in FIGS. 1 to 4, the annular body 5 and the annular oil throwers 10 are cast in one piece. The oil throwers 10 have an outer transversal surface 16 which is generally bulging outwards and comprise an inner protrusion 11 and an outer protrusion 12 which are annular and continuous.

According to a second embodiment shown in FIGS. 5 to 8, the oil throwers 10 comprise a plurality of adjacent inner 11 and outer 12 protrusions. Protrusions 11,12 are positioned on the transversal edges of openings 6, so that the annular oil throwers have alternating fins 17 on the transversal edges and notches 18 between the openings 6.

To prevent solid particles in contact with the shell from entering, the outer transversal surface 16 of each oil thrower 10 is curved towards the other oil thrower 10.

As a variation, not shown, the shell may have a combination of annular oil throwers 10 according to the first or the second embodiment described hereabove. One of the oil throwers 10 or both oil throwers 10 may particularly be provided with an annular and continuous protrusion on one side of the body and alternating fins 17 and notches 18 on the other side of the body. Besides, one of the oil throwers 10 may have an outer transversal surface 16 bulging outwards and the other oil thrower 10 may have an outer transversal surface 16 bulging towards the oil thrower 10 having an outer transversal surface 16 bulging outwards.

The shell may further be made of several parts associated by suitable means. More particularly the annular body 5 may comprise several parts, notably two parts. According to the third embodiment shown in FIGS. 9 to 16, the annular oil thrower 10 having the greater diameter may be associated with the transversal edge of the body 5 by suitable association means. As a possibly additional variation, the oil thrower 10 having the smaller diameter may be associated with the body 5 by suitable association means.

The association means may comprise centering pads 19 and hooks 20 positioned on the transversal edge of the annular body 5, the centering pads 19 and the hooks 20 cooperating with holes 21 provided on the annular oil thrower 10.

Figure 16A:
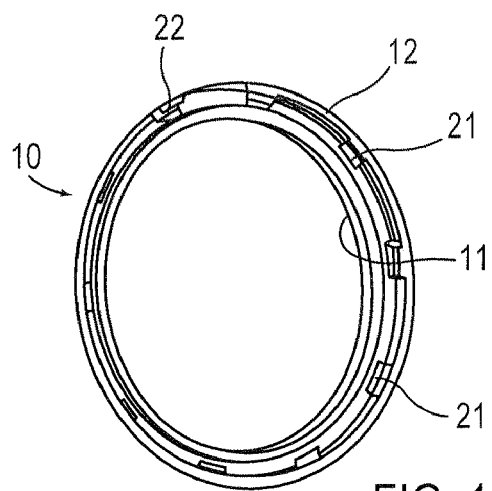
FIGS. 16a and 16b are views of the oil thrower large diameter side and of the shell body in FIG. 9, respectively, the oil thrower being separated from the annular body.
Figure 16B:
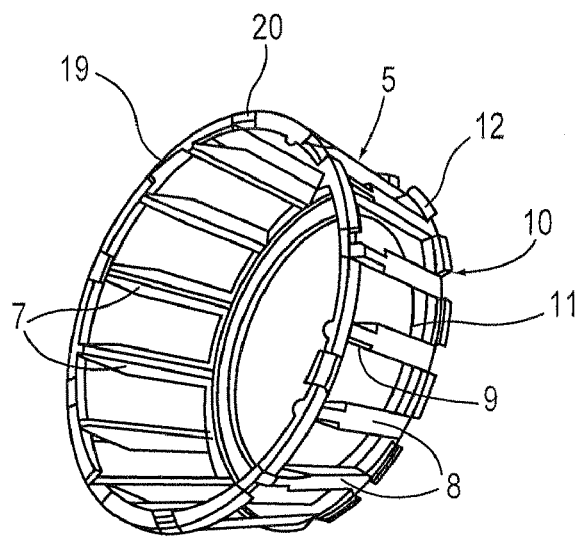

In FIG. 16b, the body 5 is provided with five hooks 20 equally distributed on the extension of the material brides 7 and with five centering pads 19, each being positioned at the same distance from two consecutive hooks 20. Besides, the oil thrower 10 may have a rim 22 extending radially from the outer protrusion 12 and partially closing each hole 21, in order to enhance the behavior of the hooks in the holes 21.

The invention claimed is:

1. A roller bearing comprising:
   an inner ring having a raceway extending diagonal relative to a longitudinal axis of the roller bearing;
   an outer ring having a raceway extending diagonal relative to the longitudinal axis of the roller bearing; a plurality of conical rolling bodies, each conical rolling body being provided with its own rotation axis and positioned between the raceways of the inner and outer rings to allow relative rotation of the inner and outer rings; and
   a shell comprising:
      a tapered annular body having a large diameter end and a small diameter end, wherein the tapered annular body is mounted between the inner and outer rings, the tapered annular body comprising equally distributed openings, wherein a conical rolling body is positioned along its own rotation axis (R) in each of the openings,
      an annular oil thrower extending radially relative to each transversal edge of the inner and outer rings wherein each annular oil thrower includes at least one radial inner protrusion extending from the large and small diameter ends of the tapered annular body toward the inner ring and at least one radial outer protrusion extending from the large and small diameter ends of the tapered annular body toward the outer ring, wherein the radial inner protrusion of each annular oil thrower extends to the transversal edge of the inner ring, wherein a free end of each protrusion is positioned opposite and away from a corresponding one of the inner and outer ring, wherein axial and radial functional clearances are defined between the radial inner and outer protrusions and the inner and outer rings, and wherein the axial and radial functional clearances are dimensioned to allow passage of a bearing lubrication fluid therethrough and serve as a barrier to passage of solid particles therethrough.

2. The roller bearing according to claim 1, wherein at least one transversal edge of the outer ring is located between transversal edges of the inner ring, and wherein the free ends of the radial outer and inner protrusions of the annular oil thrower are positioned opposite a radial surface of the outer ring and an axial surface of the inner ring.

3. The roller bearing according to claim 2, wherein the outer ring has an axial dimension that is smaller than an axial dimension of the inner ring.

4. A shell mounted in a roller bearing having an inner ring with a raceway that extends diagonal relative to a longitudinal axis of the roller bearing, and an outer ring having a raceway extending diagonal relative to the longitudinal axis of the roller bearing, the shell comprising:

a tapered annular body having a large diameter end, a small diameter end, and equally distributed openings defined therebetween;

a rolling body is positioned within each opening along its own rotation axis (R); and a plurality of annular oil throwers extending radially relative to each transversal edge of the inner and outer rings, wherein each annular oil thrower includes at least one radial inner protrusion extending from the large and small diameter ends of the tapered annular body toward the inner ring and at least one radial outer protrusion extending from the large and small diameter ends of the tapered annular body toward the outer ring, wherein the radial inner protrusion of each annular oil thrower extends to the transversal edge of the inner ring, wherein a free end of each protrusion is positioned opposite and away from a corresponding one of the inner and outer ring, wherein axial and radial functional clearances are defined between the radial inner and outer protrusions and the inner and outer rings, and wherein the axial and radial functional clearances are dimensioned to allow passage of a bearing lubrication fluid therethrough and serve as barrier to passage of solid particles therethrough.

5. The shell according to claim 4, wherein the tapered annular body comprises bridges located between neighboring openings, and an axial groove provided on a portion of each side face of the bridges, wherein the groove is located adjacent to a large diameter annular oil thrower.

6. The shell according to claim 4, wherein an outer transversal surface of at least one annular oil thrower of the plurality of annular oil throwers is bent towards another oil thrower of the plurality of annular oil throwers.

7. The shell according to claim 4, wherein at least one of the radial inner and outer protrusions of at least one oil annular thrower of the plurality of annular oil throwers is continuous.

8. The shell according to claim 4, wherein the radial inner and outer protrusions of each annular oil thrower of the plurality of annular oil throwers is positioned on transversal edges of each opening to provide each annular oil thrower with alternating fins on the transversal edges and notches between neighboring openings.

9. The shell according to claim 4, further comprising association means for associating at least one annular oil thrower with the transversal edge of the tapered annular body.

10. The shell according to claim 9, wherein the association means comprises centering pads and hooks provided on the transversal edge of the tapered annular body, wherein the centering pads and the hooks cooperate with holes defined on the at least one annular oil thrower.

* * * * *